US011149705B2

(12) United States Patent
Hanai et al.

(10) Patent No.: US 11,149,705 B2
(45) Date of Patent: Oct. 19, 2021

(54) ENGINE CONTROLLER AND ENGINE CONTROL METHOD (71) Applicant: TOYOTA JIDOSHA KABUSHIKI KAISHA, Toyota (JP)

(72) Inventors: Norihito Hanai, Toyota (JP); Takayuki Hosogi, Toyota (JP); Kenji Senda, Okazaki (JP); Rihito Kaneko, Miyoshi (JP); Masaaki Yamaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/914,557

(22) Filed: Jun. 29, 2020

(65) Prior Publication Data

US 2021/0033059 A1 Feb. 4, 2021

(30) Foreign Application Priority Data

Jul. 31, 2019 (JP) .............................. JP2019-140611

(51) Int. Cl.
*F02P 5/15* (2006.01)
*F02P 5/152* (2006.01)
*F02D 41/14* (2006.01)
*F02D 41/24* (2006.01)

(52) U.S. Cl.
CPC ........ *F02P 5/1522* (2013.01); *F02D 41/1498* (2013.01); *F02D 41/2438* (2013.01); *F02D 41/2454* (2013.01); *F02D 41/2477* (2013.01)

(58) Field of Classification Search
CPC ................ F02P 5/1522; F02D 41/2454; F02D 41/2438; F02D 41/1498; F02D 41/2477
See application file for complete search history.

(56) References Cited

U.S. PATENT DOCUMENTS

2017/0226956 A1* 8/2017 Suzuki .................... F02D 41/30
2017/0226981 A1* 8/2017 Furuishi ................ F02D 35/023
2017/0350328 A1* 12/2017 Matsushima ......... F02D 35/027
2019/0128212 A1* 5/2019 Polonowski .......... F02D 35/027
2020/0362785 A1* 11/2020 Miyazaki ............ F02D 41/1498

FOREIGN PATENT DOCUMENTS

JP      2012-246810 A    12/2012
JP      2017-115592 A     6/2017

* cited by examiner

*Primary Examiner* — Joseph J Dallo
(74) *Attorney, Agent, or Firm* — Oblon, McClelland, Maier & Neustadt, L.L.P.

(57) ABSTRACT

An engine controller includes an ignition timing control unit and a rich imbalance determining unit. The rich imbalance determining unit designates one of multiple cylinders as a subject cylinder for determination and executes lean active control that commands a smaller amount of fuel injection for the subject cylinder than for the other cylinders. The rich imbalance determining unit determines whether an air-fuel ratio of the subject cylinder deviates to be richer based on a rotational fluctuation amount of a crankshaft during the execution of the lean active control. The ignition timing control unit executes an advancement limiting process that limits advancement of the ignition timing by the knock control during the execution of the lean active control.

6 Claims, 5 Drawing Sheets

ENGINE CONTROLLER AND ENGINE CONTROL METHOD

BACKGROUND

1. Field

The present disclosure relates to an engine controller and an engine control method that detect variations in air-fuel ratio among cylinders.

2. Description of Related Art

In an engine having multiple cylinders, variations in injection characteristics of injectors of the respective cylinders can cause variations in the air-fuel ratio among the cylinders, or an air-fuel ratio imbalance. Japanese Laid-Open Patent Publication No. 2017-115592 discloses an engine controller that determines whether an engine is in a rich imbalance state, in which the air-fuel ratio of any of multiple cylinders deviates to be richer than the air-fuel ratio of the other cylinders.

The engine controller of the above publication determines whether there is a rich imbalance in the following manner. First, the controller executes lean active control that commands an injector of a subject cylinder for the rich imbalance determination to inject an amount of fuel that corresponds to an air-fuel ratio leaner than the stoichiometric air-fuel ratio, and commands the other injectors to inject an amount of fuel that corresponds to the stoichiometric air-fuel ratio. If there is no deviation in air-fuel ratio between the subject cylinder and the other cylinders before the lean active control is started, the execution of the control creates deviation in air-fuel ratio among the cylinders, which increases rotational fluctuation of the crankshaft. If the air-fuel ratio of the subject cylinder deviates to be richer before the lean active control is started, the execution of the control reduces the deviation in air-fuel ratio between the subject cylinder and the other cylinders, so that rotational fluctuation of the crankshaft is not increased. Thus, it is possible to determine whether there is a rich imbalance of the subject cylinder based on the amount of rotational fluctuation of the crankshaft during the execution of the lean active control.

In a spark-ignition engine, knock control of the ignition timing is executed in order to suppress knocking in some cases. The knock control advances the ignition timing while knocking is not detected and retards the ignition timing when knocking is detected, thereby causing the ignition timing to reach an advancement limit of ignition timing that suppresses knocking. In the engine in which such knock control of the ignition timing is executed, the following problems can occur if the above-described lean active control is executed to determine whether there is a rich imbalance.

When the lean active control changes the air-fuel ratio of the subject cylinder to an air-fuel ratio leaner than the stoichiometric air-fuel ratio, combustion in the subject cylinder is slowed, so that knocking is unlikely to occur. As a result, the frequency of occurrence of knocking is reduced in the entire engine. Thus, the ignition timing may be advanced by the knock control after the lean active control is started. In such a case, when the air-fuel ratio of the subject cylinder is returned to the original air-fuel ratio, the ignition timing is excessively advanced. Accordingly, knocking may occur when the lean active control is ended.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect of the present disclosure, an engine controller configured to control an engine that includes cylinders is provided. The engine controller includes an ignition timing control unit and a rich imbalance determining unit. The ignition timing control unit controls ignition timing of the engine. The ignition timing control unit is configured to execute knock control that advances the ignition timing while knocking is not detected and retards the ignition timing when knocking is detected, thereby adjusting the ignition timing to a trace knock point that is an advancement limit of the ignition timing at which knocking can be suppressed. The rich imbalance determining unit designates one of the cylinders as a subject cylinder for determination. The rich imbalance determining unit is configured to execute lean active control that commands a smaller amount of fuel injection for the subject cylinder than for the other cylinders, and to determine whether an air-fuel ratio of the subject cylinder deviates to be richer based on a rotational fluctuation amount of a crankshaft during the execution of the lean active control. The ignition timing control unit is configured to execute an advancement limiting process that limits advancement of the ignition timing by the knock control during the execution of the lean active control.

The above-described engine controller limits advancement of the ignition timing by the knock control during the execution of the lean active control. Accordingly, a change of the air-fuel ratio to the leaner side by the lean active control causes knocking to be unlikely to occur in the subject cylinder. This reduces the advancement of the ignition timing by the knock control after the lean active control is started even if the frequency of occurrence of knocking is reduced in the entire engine. Thus, the ignition timing at the end of the lean active control is unlikely to be significantly advanced as compared to that at the start of the lean active control. This suppresses the occurrence of knocking after the lean active control is ended.

If knocking is detected during the above-described advancement limiting process, the ignition timing may be immediately retarded to suppress knocking. In the above-described engine controller, the ignition timing control unit is preferably configured to execute, even when the advancement limiting process is being executed, retardation of the ignition timing in the knock control in a same manner as in a state in which the advancement limiting process is not being executed.

When the ignition timing control unit of the above-described engine controller is configured to execute the knock control by updating a value of a knock control amount, which is an advancement correction amount of the ignition timing for the knock control, in accordance with whether knocking has been detected, the ignition timing control unit executes the advancement limiting process by limiting an update range of the value of the knock control amount up to an upper limit guard value. In this case also, an update of the knock control amount is permitted in a range up to the upper limit guard value. Therefore, if knocking is detected during the above-described advancement limiting process, knocking can be suppressed by retarding the ignition timing.

When the ignition timing control learns, as the knock learning value, the adjustment amount of the ignition timing by the knock control, an inappropriate value may be learned as the knock learning value if the learning of the knock learning value is performed during the execution of the above-descried advancement limiting process. In such a case, the learning of the knock learning value may be suspended during the execution of the advancement limiting process.

In another aspect of the present disclosure, an engine control method of controlling an engine that includes cylinders is provided. The engine control method includes: executing knock control that advances ignition timing while knocking is not detected and retards the ignition timing when knocking is detected, thereby adjusting the ignition timing to a trace knock point that is an advancement limit of the ignition timing at which knocking can be suppressed; designating one of the cylinders as a subject cylinder for determination; executing lean active control that commands a smaller amount of fuel injection for the subject cylinder than for the other cylinders; determining whether an air-fuel ratio of the subject cylinder deviates to be richer based on a rotational fluctuation amount of a crankshaft during the execution of the lean active control; and limiting advancement of the ignition timing by the knock control during the execution of the lean active control.

In a further aspect of the present disclosure, an engine controller configured to control an engine that includes cylinders is provided. The engine controller includes a processing circuit that is configured to: execute knock control to control ignition timing of the engine, wherein the knock control advances the ignition timing while knocking is not detected and retards the ignition timing when knocking is detected, thereby adjusting the ignition timing to a trace knock point that is an advancement limit of the ignition timing at which knocking can be suppressed; designate one of the cylinders as a subject cylinder for determination; execute lean active control that commands a smaller amount of fuel injection for the subject cylinder than for the other cylinders; determine whether an air-fuel ratio of the subject cylinder deviates to be richer based on a rotational fluctuation amount of a crankshaft during the execution of the lean active control; and execute an advancement limiting process that limits advancement of the ignition timing by the knock control during the execution of the lean active control.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An engine controller 22 according to an embodiment will be described with reference to FIGS. 1 to 7. The engine controller 22 of the present embodiment is employed in a vehicle-mounted engine 10.

Figure 1:
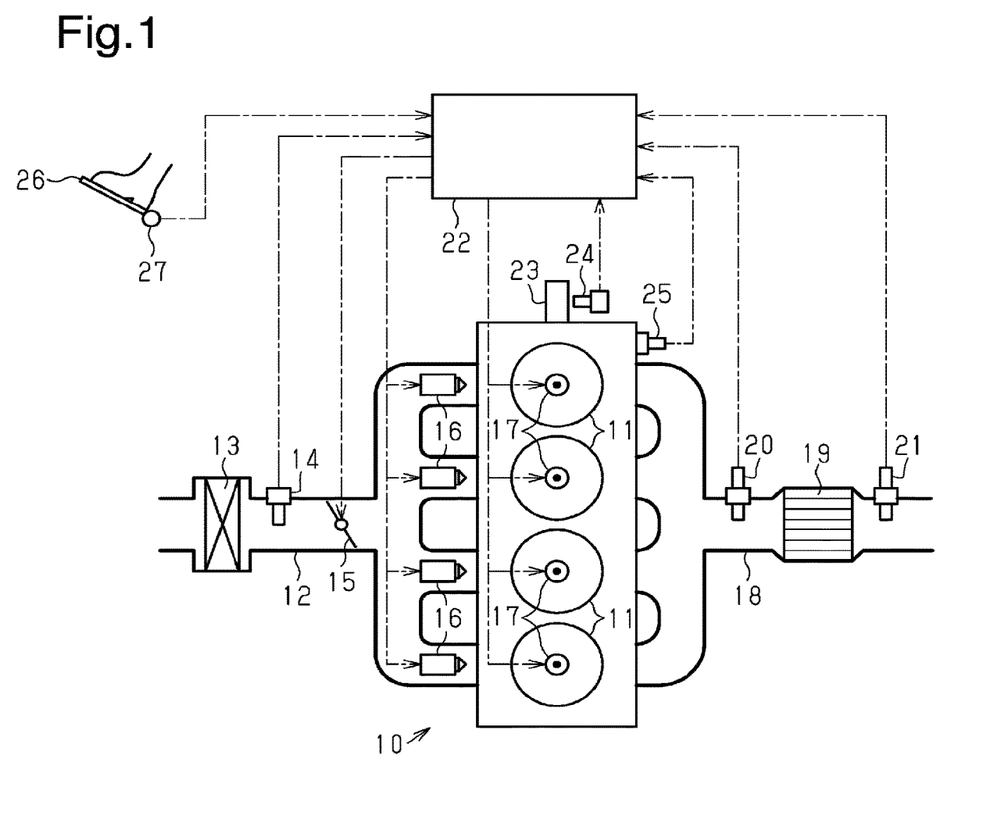
FIG. 1 is a diagram schematically showing a configuration of an engine controller according to an embodiment and an engine with which the engine controller is employed.

First, the configuration of the engine 10 according to the present embodiment will be described with reference to FIG. 1. The engine 10 includes multiple cylinders 11. In the following description, the number of cylinders of the engine 10 is represented by N. FIG. 1 illustrates an example of a configuration of the engine 10 of which the number of cylinders N is four. In the following description, the cylinders 11, the number of which is N, will be referred to as a first cylinder, a second cylinder, . . . , and Nth cylinder.

The engine 10 is provided with an air cleaner 13 in an intake passage 12. The air cleaner 13 filters out impurities such as dust in intake air. The intake passage 12 is provided with an air flow meter 14 in a section downstream of the air cleaner 13. The air flow meter 14 detects an intake air amount Ga, which is the flow rate of the intake air in the intake passage 12. The intake passage 12 is also provided with a throttle valve 15 in a section downstream of the air flow meter 14. The throttle valve 15 regulates the intake air amount Ga. The intake passage 12 is branched into four sections on the downstream side of the throttle valve 15 and connected to the respective cylinders 11 at the ends of the branched sections.

The engine 10 has injectors 16 provided for the respective cylinders 11. The injectors 16 inject fuel supplied to the cylinders 11. Each cylinder 11 is provided with an ignition plug 17 that ignites, by spark discharge, an air-fuel mixture including intake air introduced through the intake passage 12 and fuel injected by the injector 16.

The engine 10 is provided with a three-way catalyst device 19 in an exhaust passage 18 for purifying exhaust gas. The three-way catalyst device 19 supports a three-way catalyst of which the exhaust gas purification efficiency is maximized when the air-fuel ratio of the air-fuel mixture burned in each cylinder 11 is the stoichiometric air-fuel ratio. The exhaust passage 18 is provided with air-fuel ratio sensors in sections upstream and downstream of the three-way catalyst device 19. These air-fuel ratio sensors, or a catalyst upstream-side air-fuel ratio sensor 20 and a catalyst downstream-side air-fuel ratio sensor 21, are configured to detect the air-fuel ratio of the air-fuel mixture that has been burned in the respective cylinders.

Next, the configuration of the engine controller 22, which is employed for the above-described engine 10, will be described. The engine controller 22 includes an electronic control unit (processing circuit) that has an arithmetic circuit and a memory circuit. The arithmetic circuit executes various types of calculation processes related to engine control, and the memory circuit stores programs and data for the engine control. The engine controller 22 is connected to the following sensors in addition to the above-described air flow meter 14, catalyst upstream-side air-fuel ratio sensor 20, and catalyst downstream-side air-fuel ratio sensor 21. That is, the engine controller 22 is connected to a crank angle sensor 24, a knock sensor 25, and an accelerator pedal sensor 27. The crank angle sensor 24 detects a rotation angle of a crankshaft 23, which is an output shaft of the engine 10. The knock sensor 25 detects vibration that accompanies knocking. The accelerator pedal sensor 27 detects the depression amount of an accelerator pedal 26 by the driver. Based on detection signals from these sensors, the engine controller 22 controls the opening degree of the throttle valve 15, the fuel injection amount of the injectors 16, the ignition timing of the ignition plugs 17, and the like. The engine controller 22 calculates an engine rotation speed NE from the detection signal of the crank angle sensor 24.

The engine controller 22 executes, as part of the engine control, air-fuel ratio feedback control for maintaining the air-fuel ratio of the air-fuel mixture burned in each cylinder 11 at the stoichiometric air-fuel ratio. The air-fuel ratio feedback control is executed by correcting, through feedback, the fuel injection amount of each injector 16 so as to reduce the deviation from the stoichiometric air-fuel ratio of the detection values of the catalyst upstream-side air-fuel ratio sensor 20 and the catalyst downstream-side air-fuel ratio sensor 21.

Rich Imbalance Determination

The feedback correction of the fuel injection amount by the air-fuel ratio feedback control is executed uniformly for all the cylinders 11. The injectors 16 have individual differences in injection characteristics. That is, even if the injectors 16 of all the cylinders 11 are commanded to inject the same amount of fuel injection, there may be variations in the amount of fuel actually injected by the injectors 16. This can create variations in air-fuel ratio among the cylinders 11, degrading the emission of the engine 10.

One of the index values that indicate the degree of variations in air-fuel ratio among the cylinders 11 is an imbalance ratio. The imbalance ratio is a value described below. One of the cylinders 11 is designated as a subject cylinder, and a fuel injection amount corresponding to the stoichiometric air-fuel ratio is referred to as a stoichiometric injection amount. It is assumed that the fuel injection amount of the cylinders other than the subject cylinder is the stoichiometric injection amount. The difference obtained by subtracting the stoichiometric injection amount from the actual fuel injection amount of the subject cylinder is divided by the stoichiometric injection amount. The quotient of the division is the value of the imbalance ratio. Thus, the value of the imbalance ratio is 0 when the fuel injection amounts of all the cylinders 11 are the stoichiometric injection amount, that is, when there are no variations in air-fuel ratio among the cylinders 11. The value of the imbalance ratio in a rich imbalance state, in which the air-fuel ratio of the subject cylinder deviates to the richer side, has a positive value. The value of the imbalance ratio in a lean imbalance state, in which the air-fuel ratio of the subject cylinder deviates to the leaner side, has a negative value.

Figure 2:
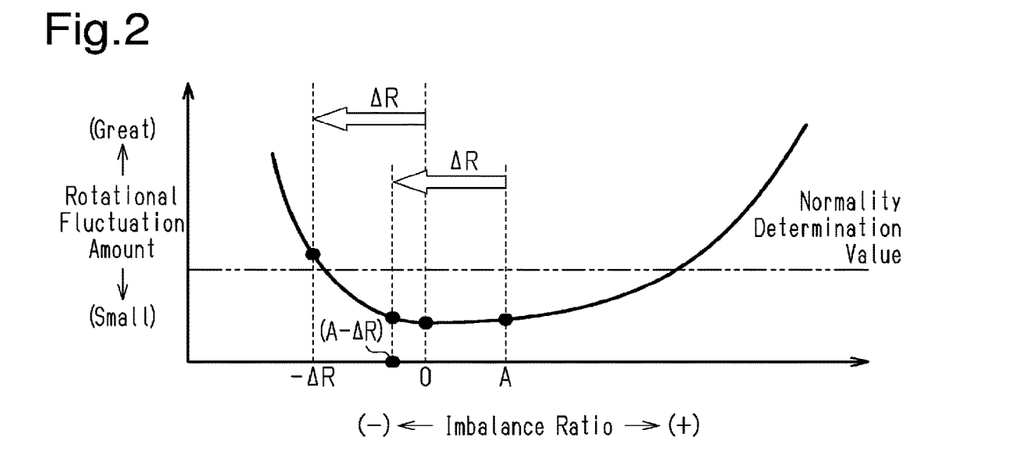
FIG. 2 is a graph showing a relationship between an imbalance ratio and a rotational fluctuation amount.

FIG. 2 shows a relationship between the imbalance ratio and a rotational fluctuation amount of the crankshaft 23. The rotational fluctuation amount of the crankshaft 23 is defined as follows. That is, when the frequency of the rotational fluctuation of the crankshaft 23 caused by variations in the air-fuel ratio among the cylinders 11 is referred to as imbalance frequency, the amplitude of the imbalance frequency component of the rotation speed of the crankshaft 23 is referred to as a rotational fluctuation amount of the crankshaft 23.

When there are variations in air-fuel ratio among the cylinders 11, the torque generated by combustion in the cylinders 11, that is, the combustion torque, also varies, which increases the rotational fluctuation of the crankshaft 23. Accordingly, the change tendency of the rotational fluctuation amount of the crankshaft 23 in relation to the imbalance ratio is as follows. The rotational fluctuation amount of the crankshaft 23 has a minimum value when the imbalance ratio is 0 and there are no variations in air-fuel ratio among the cylinders 11. The rotational fluctuation amount increases as the imbalance ratio deviates further from 0 and the variations in air-fuel ratio among the cylinders 11 increase. The rotational fluctuation amount of the crankshaft 23 can be an index value of the degree of variations in air-fuel ratio among the cylinders 11.

The rotational fluctuation amount of the crankshaft 23 increases more slowly when the imbalance ratio is changed in the positive direction from 0 than when the imbalance ratio is changed in the negative direction from 0. That is, the responsivity of the rotational fluctuation amount of the crankshaft 23 to a rich imbalance is lower than in the case of a lean imbalance. The present embodiment determines whether there is a rich imbalance after executing lean active control, which commands a smaller amount of fuel injection for the subject cylinder than for the other cylinders.

In the present embodiment, the fuel injection amount of the other cylinders is increased by a prescribed amount $\Delta Q$, and the fuel injection amount of the subject cylinder is reduced by $(N-1)\cdot\Delta Q$, so that the average value of the air-fuel ratios of the cylinders 11 is the stoichiometric air-fuel ratio. The lean active control is executed in this state. As described above, N represents the number of cylinders of the engine 10. When the rotational fluctuation amount of the crankshaft 23 during the execution of the lean active control is greater than or equal to a prescribed normality determination value, it is determined that the subject cylinder is not in a rich imbalance state. When the rotational fluctuation amount is less than the normality determination value, it is determined that the subject cylinder is in a rich imbalance state.

If the rotational fluctuation amount of the crankshaft 23 is already greater than or equal to the normality determination value before the lean active control is executed, at least one of the cylinders is in a lean imbalance state or a rich imbalance state. In such a situation, the rich imbalance determination in the above-described manner is not performed in the present embodiment.

When the lean active control is executed, the imbalance ratio of the subject cylinder changes in the negative direction. The amount of change of the imbalance ratio in the negative direction at this time is referred to as $\Delta R$. If the lean active control is executed when the imbalance ratio of the subject cylinder is 0, the imbalance ratio of the subject cylinder after the execution becomes $-\Delta R$. In the present embodiment, the above-described normality determination value is set to a value that is slightly less than the rotational fluctuation amount of the crankshaft 23 at this time.

If the lean active control is executed in a rich imbalance state, in which the imbalance ratio has a positive value A, the imbalance ratio of the subject cylinder after the execution is $(A-\Delta R)$. If the condition of $A \geq \Delta R$ is met, the imbalance ratio during the execution of the lean active control is closer to 0 than before the execution. Accordingly, the rotational fluctuation amount of the crankshaft 23 is smaller at this time than before the execution of the lean active control. If the condition of $A < \Delta R$ is met, the imbalance ratio during the execution of the lean active control is a negative value that is closer to 0 than $-\Delta R$. Accordingly, the rotational fluctuation amount of the crankshaft 23 does not exceed the normality determination value. As described above, it is possible to determine whether the subject cylinder is in a rich imbalance state based on whether the rotational fluctuation amount of the crankshaft 23 during the execution of the lean active control is less than the normality determination value.

Figure 3:
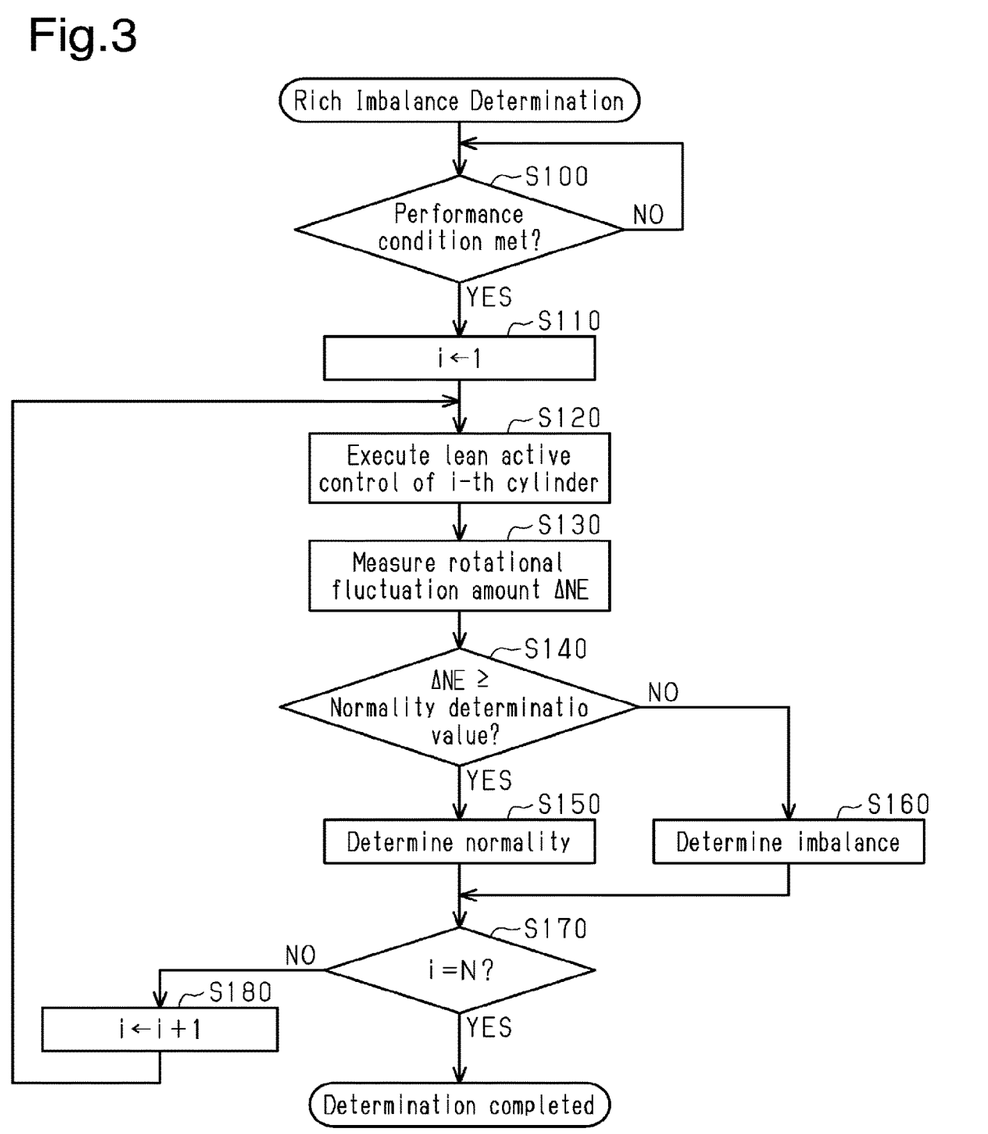
FIG. 3 is a flowchart showing processes related to a rich imbalance determination in the engine controller of the embodiment.

FIG. 3 shows a flow of processes related to the rich imbalance determination of the engine controller 22. The series of processes shown in FIG. 3 is started when start-up of the engine 10 is completed. In the present embodiment, the engine controller 22, which performs the rich imbalance determination, corresponds to a rich imbalance determining unit.

When start-up of the engine 10 is completed, it is first determined whether a performance condition for the rich imbalance determination is met in step S100 (S100). If the performance condition is met (YES), the process proceeds to step S110. In contrast, if the performance condition is not met (NO), the determination of step S100 is performed again after a prescribed amount of time has elapsed. The performance condition for the rich imbalance determination includes a condition that certain quantifiably operations of the engine 10, such as the engine rotation speed NE and the intake air amount Ga, are stable. The performance condition also includes a condition that the rich imbalance determination has not been completed after the start-up of the engine 10 of this time. That is, in the present embodiment, the rich imbalance determination for the cylinders 11 is performed only once per trip.

When the process proceeds to step S110, the cylinder number i of the subject cylinder for the determination is set to 1 in step S110. That is, the subject cylinder is set to the first cylinder at this time.

Subsequently, in step S120, the lean active control of the i-th cylinder is executed. In the next step S130, the rotational fluctuation amount of the crankshaft 23 during the execution of the lean active control is measured.

When the measurement of the rotational fluctuation amount is completed, it is determined whether the measured value $\Delta NE$ of the rotational fluctuation amount is greater than or equal to the normality determination value in the subsequent step S140. If the measured value $\Delta NE$ is greater than or equal to the normality determination value (YES), it is determined that the situation is normal, that is, the subject cylinder is not in a rich imbalance state in step S150. The process then proceeds to step S170. If the measured value $\Delta NE$ is less than the normality determination value (NO), it is determined that the subject cylinder is in a rich imbalance state in step S160. The process then proceeds to step S170.

When the process proceeds to step S170, it is determined whether the cylinder number i of the subject cylinder of the rich imbalance determination is the same number as the number of cylinders N of the engine 10; that is, whether the rich imbalance determination of all the cylinders 11 of the engine 10 has been completed. If the determination for all the cylinders 11 is completed (YES), the process related to the rich imbalance determination in the current trip is ended. In contrast, if the determination for all the cylinders 11 of the engine 10 has not been completed (NO), the process returns to step S120 after the cylinder number i of the subject cylinder is incremented by 1 in step S180.

Knock Control

The engine controller 22 executes knock control of the ignition timing during operation of the engine 10. The knock control advances the ignition timing while knocking is not detected by the knock sensor 25 and retards the ignition timing when knocking is detected, thereby adjusting the ignition timing to a knock limit ignition timing, which is an advancement limit at which knocking can be suppressed.

Figure 4:
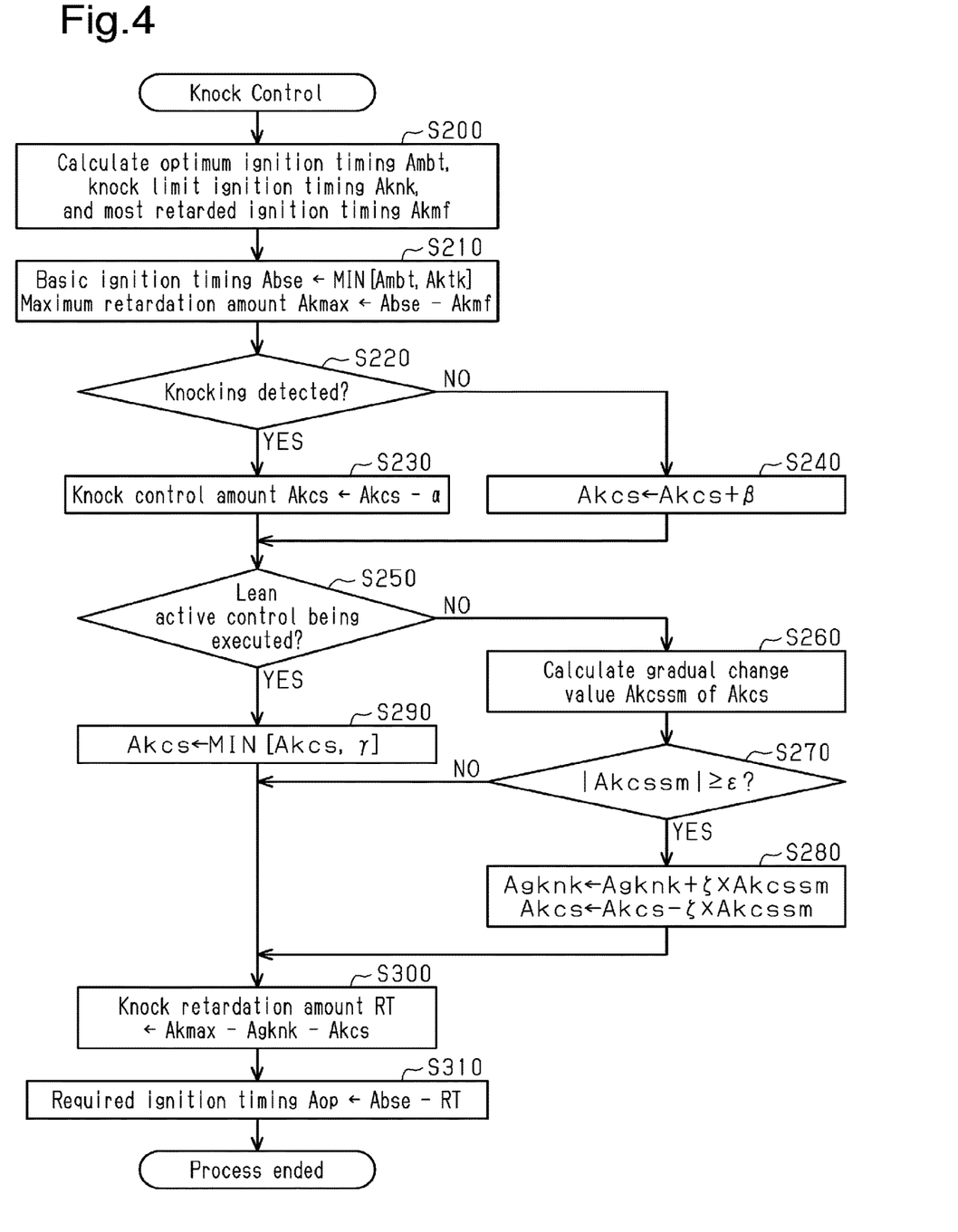
FIG. 4 is a flowchart showing processes related to knock control in the engine controller.

FIG. 4 is a flowchart showing processes related to knock control in the engine controller 22. The engine controller 22 repeatedly executes the processes of this routine at each prescribed control cycle.

When the process related to the knock control in the current control cycle is started, an optimum ignition timing Ambt, a knock limit ignition timing Aknk, and a most retarded ignition timing Akmf are calculated based on the engine rotation speed NE and an engine load factor KL at step S200. The engine rotation speed NE and the engine load factor KL are used as parameters for defining the current operating point of the engine 10. The optimum ignition timing Ambt is an ignition timing at which a maximum combustion torque is attained at the current operating point of the engine 10. The knock limit ignition timing Aknk is an index value of an advancement limit of the ignition timing at which knocking can be suppressed. The most retarded ignition timing Akmf is an index value of an advancement limit of the ignition timing at which knocking never occurs at the current operating point of the engine 10.

Subsequently, at step S210, the more retarded one of the optimum ignition timing Ambt and the knock limit ignition timing Aknk is selected as a basic ignition timing Abse. Also, at step S210, the value of a maximum retardation amount Akmax is set to the retarded amount from the basic ignition timing Abse to the most retarded ignition timing Akmf.

In the subsequent step S220, it is determined whether the knock sensor 25 has detected knocking. If knocking has been detected (YES), the process proceeds to step S230. At step S230, a knock control amount Akcs, which is an advancement correction amount of the ignition timing by the knock control, is updated to a value that is obtained by reducing the value prior to the update by a prescribed retardation amount $\alpha$. The process then proceeds to step S250. If knocking has not been detected (NO), the process proceeds to step S240. At step S240, the knock control amount Akcs is updated to a value that is obtained by increasing the value prior to the update by a prescribed advancement amount $\beta$. The value of the retardation amount $\alpha$ is set to be greater than the value of the advancement amount $\beta$.

When the process proceeds to step S250, it is determined whether the lean active control is being executed at step S250. If the lean active control is not being executed (NO), the process proceeds to step S260. If the lean active control is being executed (YES), the process proceeds to step S290.

When the lean active control is not being executed and the process proceeds to step S260, a gradual change value Akcssm of the knock control amount Akcs is calculated in step S260. In the subsequent step S270, it is determined whether the absolute value of the gradual change value Akcssm is greater than or equal to an update determination value ε. If the absolute value of the gradual change value Akcssm is greater than or equal to the update determination value ε (S270: YES), a knock learning value Agknk and the knock control amount Akcs are updated. The knock learning value Agknk is a learning value of the adjustment amount of the ignition timing by the knock control. The process then proceeds to step S300. In contrast, when the absolute value of the gradual change value Akcssm is less than the update determination value ε (S270: NO), the process skips step S280 and directly proceeds to step S300. In step S280, the value of the knock learning value Agknk is updated to a value obtained by adding, to the value prior to the update, a product obtained by multiplying the gradual change value Akcssm by a constant ζ, which is greater than 0 and less than 1. In step S280, the value of the knock control amount Akcs is updated to a value obtained by subtracting, from the value prior to the update, a product obtained by multiplying the gradual change value Akcssm by the constant ζ.

When the lean active control is being executed (S250: YES), so that the process proceeds to S290, an upper limit guard process of the knock control amount Akcs is executed in step S290. The process then proceeds to step S300. In the upper limit guard process of step S290, if the value of the knock control amount Akcs is less than a prescribed upper limit guard value γ, the knock control amount Akcs is maintained. If the value of the knock control amount Akcs is greater than or equal to the upper limit guard value γ, the value of the knock control amount Akcs is set to the upper limit guard value γ. In the present embodiment, when the knock control is started after start-up of the engine 10, the upper limit guard value γ is set to the initial value of the knock control amount Akcs. The initial value of the knock control amount Akcs is set to a value of which the absolute value is less than that of the update determination value ε.

When the process proceeds to step S300, the knock learning value Agknk is subtracted from the maximum retardation amount Akmax. Further, the knock control amount Akcs is subtracted from the obtained difference, and the resultant of the subtraction is calculated as the value of a knock retardation amount RT (Aknk=Akmax−Agknk−Akcs). In the subsequent step S310, the knock retardation amount RT is subtracted from the basic ignition timing Abse, and the value of a required ignition timing Aop, which is a control command value of the ignition timing, is set to the obtained difference (Abse−Aknk). Then, the process related to the knock control in the current control cycle is ended. Thereafter, the engine controller 22 controls the timing of spark discharge of the ignition plug 17 of each cylinder 11 such that air-fuel mixture is ignited at the timing indicated by the value of the required ignition timing Aop. That is, the ignition timing of each cylinder 11 is set to the required ignition timing Aop, which has been calculated in step S310.

In the above-described knock control, the required ignition timing Aop is set to timing that is advanced from the most retarded ignition timing Akmf by the amount corresponding to the sum of the knock control amount Akcs and the knock learning value Agknk. In the present embodiment, the advancement amount of the required ignition timing Aop in relation to the most retarded ignition timing Akmf is increased or reduced in accordance with whether knocking has been detected.

When the lean active control is being executed (S250: YES), the upper limit guard process of the knock control amount Akcs is executed such that the knock control amount Akcs has a value less than or equal to the upper limit guard value γ (S290). In addition, when the lean active control is being executed, the process of step S280 is skipped, so that the knock learning value Agknk is not updated. That is, when the lean active control is being executed, the learning of the knock learning value Agknk is suspended. This sets the upper limit value to the advancement amount of the required ignition timing Aop in relation to the most retarded ignition timing Akmf. As described above, the present embodiment executes the advancement limiting process, in which the advancement of the ignition timing by the knock control is limited during the execution of the lean active control. In the present embodiment, the engine controller 22 executing the above-described knock control and advancement limiting process corresponds to an ignition timing control unit.

Operation of Embodiment

As described above, the engine controller 22 according to the present embodiment executes the knock control that advances the ignition timing while knocking is not detected and retards the ignition timing when knocking is detected, thereby adjusting the ignition timing to a trace knock point, which is the advancement limit at which knocking can be suppressed. The knock control is executed by updating the value of the knock control amount Akcs, which is an advancement correction amount of the ignition timing for the knock control, in accordance with whether knocking has been detected. The adjustment amount of the ignition timing by the knock control is learned as the knock learning value Agknk. The engine controller 22 executes the lean active control at the rich imbalance determination. The lean active control commands the subject cylinder for the determination to inject a smaller amount of fuel than the other cylinders. At this time, if the subject cylinder is not in a rich imbalance state, the air-fuel ratio of the subject cylinder during the execution of the lean active control becomes leaner than the stoichiometric air-fuel ratio.

Figure 5:
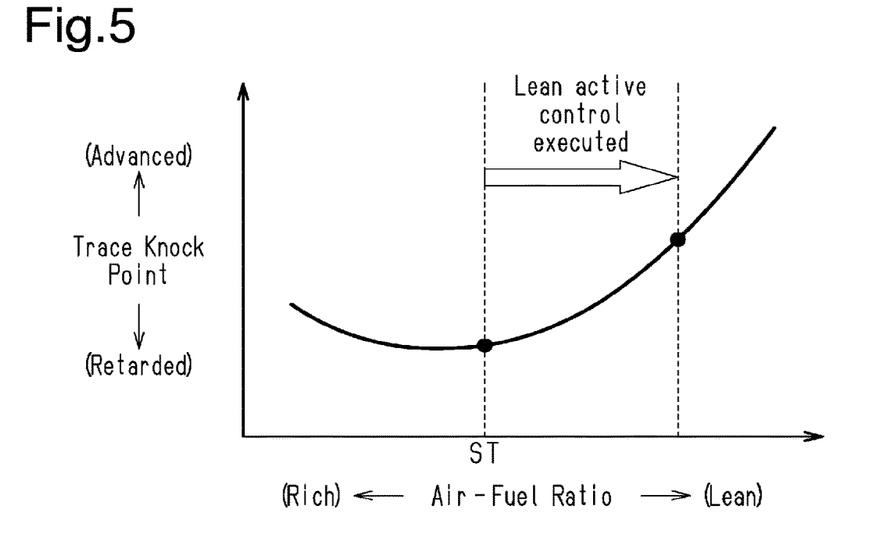
FIG. 5 is a graph showing the relationship between an air-fuel ratio and a trace knock point.

FIG. 5 shows the relationship between an air-fuel ratio and a trace knock point. The trace knock point refers to ignition timing at which knocking starts to be detected by the knock sensor 25 when the ignition timing is progressively advanced from ignition timing in a state in which knocking is not occurring. Combustion in the cylinder 11 becomes slower as the air-fuel ratio changes to be leaner. Accordingly, knocking becomes less likely to occur. Thus, as shown in FIG. 5, in a region of the air-fuel ratio that is leaner than the stoichiometric air-fuel ratio ST, the trace knock point is advanced as the air-fuel ratio becomes leaner. Therefore, when the lean active control changes the air-fuel ratio of the subject cylinder to an air-fuel ratio leaner than the stoichiometric air-fuel ratio ST, knocking becomes less likely to occur in the subject cylinder.

Figure 6:
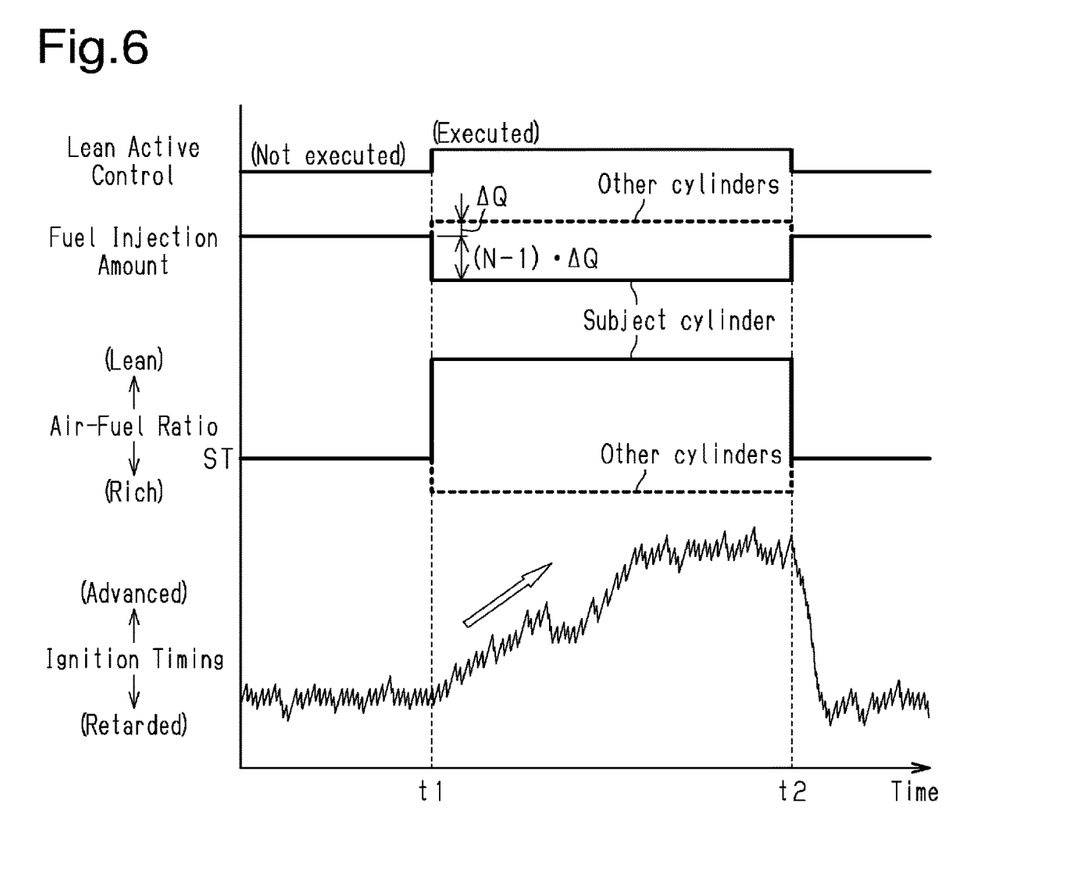
FIG. 6 is a timing diagram showing one example of a manner in which control is executed in the rich imbalance determination when an advancement limiting process is not executed.
Figure 7:
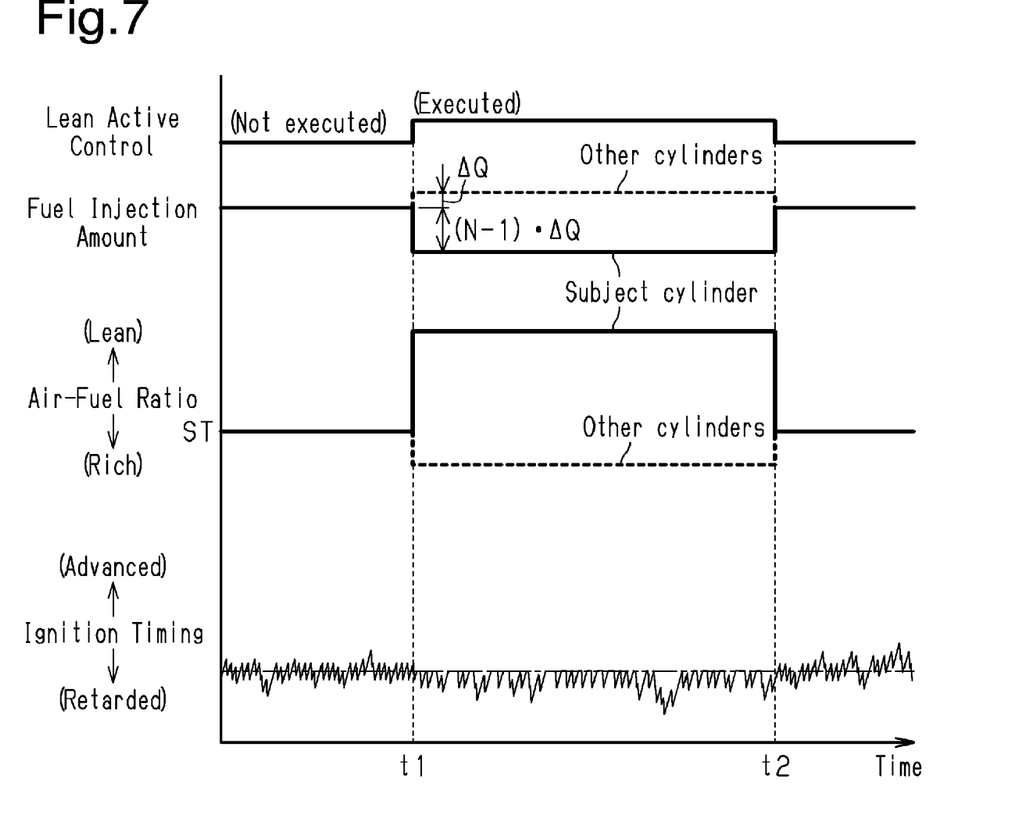
FIG. 7 is a timing diagram showing one example of a manner in which control is executed in the rich imbalance determination of the embodiment when the advancement process is executed.

FIG. 6 shows changes in parameters including the ignition timing during the rich imbalance determination when a normal knock control is executed without executing the advancement limiting process during the execution of the lean active control. FIG. 6 and FIG. 7, which will be discussed below, show changes in the ignition timing, while assuming that the engine rotation speed NE and the engine load factor KL are constant, that is, the ignition timing is not changed due to the operating state of the engine 10.

When the lean active control is started at point in time t1, the fuel injection amount of the subject cylinder for the determination is reduced. At this time, if the subject cylinder for the determination is not in a rich imbalance state, the air-fuel ratio of the subject cylinder becomes leaner than the stoichiometric air-fuel ratio, so that knocking is unlikely to occur. At this time, the air-fuel ratio of the other cylinders is changed to be slightly richer than the stoichiometric air-fuel ratio ST. This change in the air-fuel ratio has a limited influence on the frequency of occurrence of knocking in these cylinders. Thus, the frequency of occurrence of knocking in the entire engine is reduced at the start of the lean active control. In the knock control, the ignition timing is progressively advanced by the advancement amount β at a time while knocking is not detected, and the ignition timing is retarded by the retardation amount α when knocking is detected. Thus, when the frequency of occurrence of knocking is reduced, the ignition timing is advanced by the knock control.

Thereafter, when the lean active control is ended at point in time t2, the air-fuel ratio of the subject cylinder is returned to the stoichiometric air-fuel ratio ST. When the air-fuel ratio of the subject cylinder is returned to the stochiometric air-fuel ratio ST, the ignition timing that has been advanced during the execution of the lean active control is advanced compared to timing at which knocking can be suppressed. Thus, knocking may occur frequently after the end of the lean active control.

FIG. 7 shows changes in parameters including the ignition timing during the rich imbalance determination in the case of the present embodiment, which executes the advancement limiting process. In the present embodiment, advancement of the ignition timing by the knock control is limited during the execution of the lean active control as described above. Thus, the ignition timing is not advanced after the lean active control is started at the point in time t1. Thus, the ignition timing is maintained at the timing that can suppress knocking in a state in which the air-fuel ratio of the subject cylinder has been returned to the stoichiometric air-fuel ratio ST after the lean active control is ended at the point in time t2. This suppresses the occurrence of knocking after the rich imbalance determination.

The present embodiment has the following advantages.

(1) In the present embodiment, advancement of the ignition timing by the knock control is limited during the execution of the lean active control for the rich imbalance determination. Thus, the ignition timing is prevented from being advanced by the knock control during the execution of the lean active control. It is thus possible to avoid a situation in which knocking occurs after the knock control is ended.

(2) In the present embodiment, the advancement limiting process for the ignition timing through the knock control during the execution of the lean active control is executed by the upper limit guarding of the knock control amount Akcs. Accordingly, while advancement of the ignition timing is limited in the knock control, retardation of the ignition timing in the knock control is executed in the same manner as in a state in which the advancement limiting process is not being executed. Thus, if knocking is detected, the ignition timing is retarded to suppress the occurrence of knocking even during the execution of the advancement limiting process.

(3) The behavior of the value of the knock control amount Akcs during the execution of the advancement limiting process is different from the normal behavior. Thus, if learning is performed based on the gradual change value Akcssm of the knock control amount Akcs, an inappropriate value may be learned as the knock learning value Agknk. In this regard, the learning of the knock learning value Agknk is suspended during the execution of the lean active control. Thus, erroneous learning of the knock learning value Agknk by the advancement limiting process is prevented.

The present embodiment may be modified as follows. The present embodiment and the following modifications can be combined as long as the combined modifications remain technically consistent with each other.

In the above-described embodiment, the advancement limiting process for the ignition timing through the knock control during the execution of the lean active control is executed by the upper limit guarding of the knock control amount Akcs. The advancement limiting process may be executed in a manner different from the manner in the above-described embodiment. For example, the advancement limiting process may be executed by setting a limit value on the advanced side of the setting range of the required ignition timing Aop based on the required ignition timing Aop or the knock learning value Agknk at the start of the lean active control. Also, the advancement limiting process may be executed by lowering the increase rate of the knock control amount Akcs during a period in which knocking is not detected during the execution of the lean active control as compared to a case in which the lean active control is not being executed.

In the above-described embodiment, the learning of the knock learning value Agknk is suspended during the execution of the lean active control. However, the learning may be continued during the execution of the lean active control. If the advancement limiting process is not executed, the knock control may excessively advance the ignition timing during the execution of the lean active control. If learning is continued in such a situation, a value that is significantly deviated from the normal value may be learned as the knock learning value Agknk. However, if the advancement limiting process is executed, deviation of the knock learning value Agknk from the normal value is limited even if the learning is continued during the execution of the lean active control.

The manner in which the lean active control is executed may be changed. For example, in the above-described embodiment, the lean active control is executed by reducing the fuel injection amount of the subject cylinder for the rich imbalance determination, while increasing the fuel injection amount of the other cylinders. However, the lean active control may be executed simply by reducing the fuel injection amount of the subject cylinder, without increasing the fuel injection amount of the other cylinders. Alternatively, the lean active control may be executed by discretely reducing the fuel injection amount of the subject cylinder.

The engine controller 22 is not limited to a device that includes a CPU and a memory and executes software processing. For example, at least part of the processes executed by the software in each of the above-described embodiments may be executed by hardware circuits dedicated to the execution of these processes (such as ASIC). That is, the engine controller 22 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine controller configured to control an engine that includes cylinders, the engine controller comprising:
    an ignition timing control unit that controls ignition timing of the engine, the ignition timing control unit being configured to execute knock control that advances the ignition timing while knocking is not detected and retards the ignition timing when knocking is detected, thereby adjusting the ignition timing to a trace knock point that is an advancement limit of the ignition timing at which knocking can be suppressed; and
    a rich imbalance determining unit that designates one of the cylinders as a subject cylinder for determination, the rich imbalance determining unit being configured to execute lean active control that commands a smaller amount of fuel injection for the subject cylinder than for the other cylinders, and to determine whether an air-fuel ratio of the subject cylinder deviates to be richer based on a rotational fluctuation amount of a crankshaft during the execution of the lean active control,
    wherein the ignition timing control unit is configured to execute an advancement limiting process that limits advancement of the ignition timing by the knock control during the execution of the lean active control.

2. The engine controller according to claim 1, wherein the ignition timing control unit is configured to execute, even when the advancement limiting process is being executed, retardation of the ignition timing in the knock control in a same manner as in a state in which the advancement limiting process is not being executed.

3. The engine controller according to claim 1, wherein the ignition timing control unit is configured to
    execute the knock control by updating a value of a knock control amount, which is an advancement correction amount of the ignition timing for the knock control, in accordance with whether knocking has been detected, and
    execute the advancement limiting process by limiting an update range of the value of the knock control amount up to an upper limit guard value.

4. The engine controller according to claim 1, wherein the ignition timing control unit is configured to
    learn an adjustment amount of the ignition timing by the knock control as a knock learning value, and
    suspend the learning of the knock learning value during the execution of the advancement limiting process.

5. An engine control method of controlling an engine that includes cylinders, the engine control method comprising:
    executing knock control that advances ignition timing while knocking is not detected and retards the ignition timing when knocking is detected, thereby adjusting the ignition timing to a trace knock point that is an advancement limit of the ignition timing at which knocking can be suppressed;
    designating one of the cylinders as a subject cylinder for determination;
    executing lean active control that commands a smaller amount of fuel injection for the subject cylinder than for the other cylinders;
    determining whether an air-fuel ratio of the subject cylinder deviates to be richer based on a rotational fluctuation amount of a crankshaft during the execution of the lean active control; and
    limiting advancement of the ignition timing by the knock control during the execution of the lean active control.

6. An engine controller configured to control an engine that includes cylinders, the engine controller comprising a processing circuit that is configured to:
    execute knock control to control ignition timing of the engine, wherein the knock control advances the ignition timing while knocking is not detected and retards the ignition timing when knocking is detected, thereby adjusting the ignition timing to a trace knock point that is an advancement limit of the ignition timing at which knocking can be suppressed;
    designate one of the cylinders as a subject cylinder for determination;
    execute lean active control that commands a smaller amount of fuel injection for the subject cylinder than for the other cylinders;
    determine whether an air-fuel ratio of the subject cylinder deviates to be richer based on a rotational fluctuation amount of a crankshaft during the execution of the lean active control; and
    execute an advancement limiting process that limits advancement of the ignition timing by the knock control during the execution of the lean active control.

* * * * *